US012658716B2

(12) United States Patent
Shah et al.

(10) Patent No.: US 12,658,716 B2
(45) Date of Patent: Jun. 16, 2026

(54) DISTRIBUTED OPTIMIZATION FOR HYBRID AC-DC MICROGRID

(71) Applicant: Caterpillar Inc., Peoria, IL (US)

(72) Inventors: Chinmay Shah, Peoria, IL (US); Lalit Kishore Marepalli, Peoria, IL (US); Gregory Scott Hasler, Pekin, IL (US); Sowmya Nagesh, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/972,133

(22) Filed: Dec. 6, 2024

(65) Prior Publication Data

US 2026/0163380 A1 Jun. 11, 2026

(51) Int. Cl.
| | |
|---|---|
| *H02J 4/00* | (2026.01) |
| *H02J 3/00* | (2026.01) |
| *H02J 3/007* | (2026.01) |
| *H02J 3/02* | (2026.01) |
| *H02J 3/46* | (2026.01) |

(52) U.S. Cl.
CPC ............... *H02J 4/00* (2013.01); *H02J 3/0075* (2020.01); *H02J 3/02* (2013.01); *H02J 3/46* (2013.01)

(58) Field of Classification Search
CPC .... H02J 3/0075; H02J 3/02; H02J 3/46; H02J 4/00
USPC .......................................................... 307/24
See application file for complete search history.

(56) References Cited

U.S. PATENT DOCUMENTS

| | | |
|---|---|---|
| 2023/0307922 A1 | 9/2023 | Xia et al. |
| 2024/0204533 A1 | 6/2024 | Ferdowsi et al. |

FOREIGN PATENT DOCUMENTS

| | | |
|---|---|---|
| IN | 202221012157 A | 4/2022 |
| IN | 202231075196 A | 12/2022 |
| IN | 202441029567 A | 4/2024 |
| IN | 202441031863 A | 5/2024 |
| KR | 20240106620 A | 7/2024 |

*Primary Examiner* — Hal Kaplan
(74) *Attorney, Agent, or Firm* — Harrity & Harrity LLP

(57) ABSTRACT

A microgrid system includes a plurality of energy resource systems, including direct current (DC) energy resource systems and alternating current (AC) energy resource systems, configured to supply power to a microgrid; a plurality of local controllers respectively associated with an energy resource system for controlling the respective energy resource system; and a microgrid controller. Each local controller is configured to determine an available output power for a respective energy resource system based on one or more operational constraints, and transmit an indication of the available output power to the microgrid controller. The microgrid controller is configured to determine, based on the available output power indicated by each local controller, a net available DC output power available from the DC energy resource systems and a net available AC output power available from the AC energy resource systems.

20 Claims, 6 Drawing Sheets

400

500

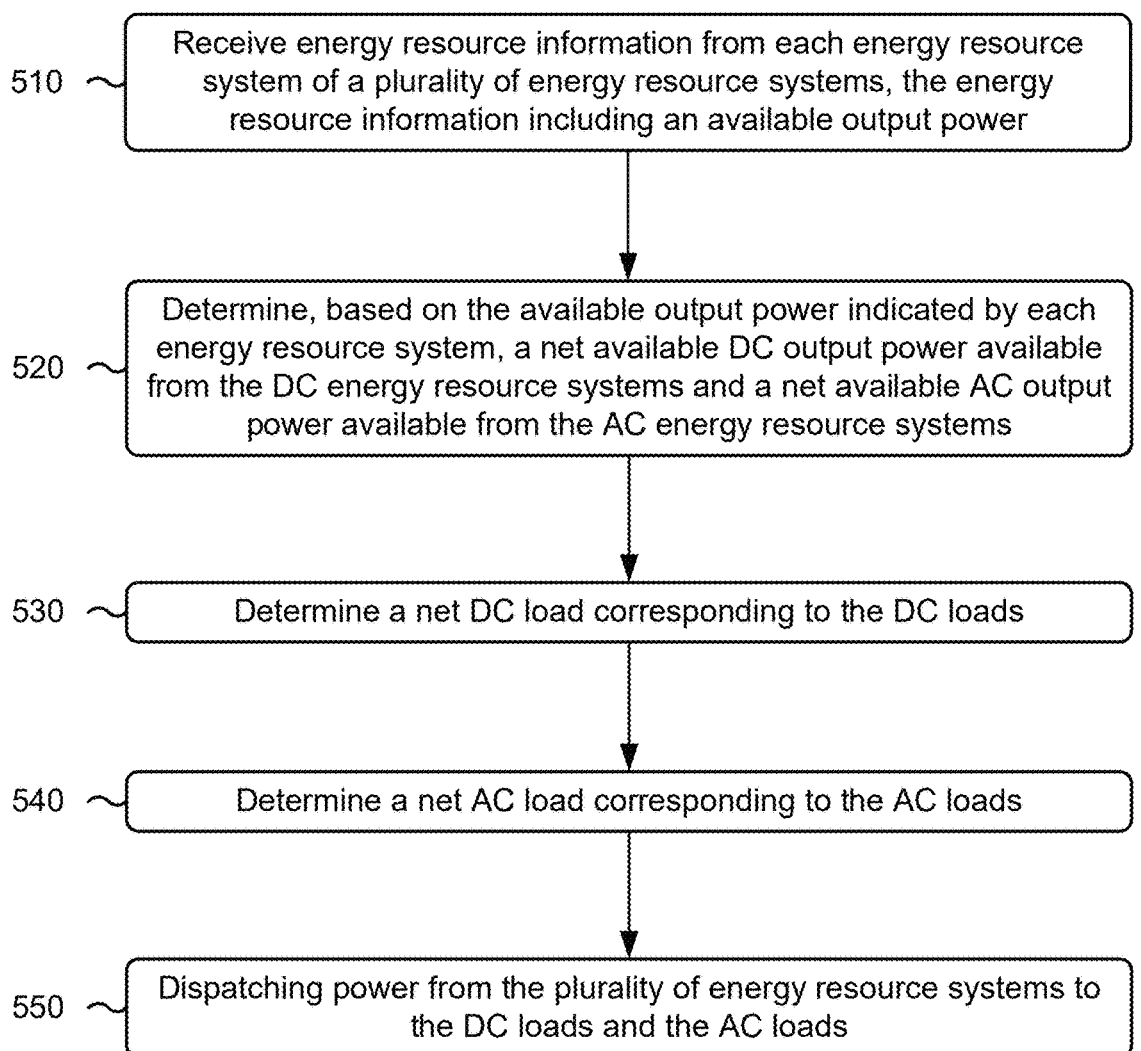

510 — Receive energy resource information from each energy resource system of a plurality of energy resource systems, the energy resource information including an available output power 520 — Determine, based on the available output power indicated by each energy resource system, a net available DC output power available from the DC energy resource systems and a net available AC output power available from the AC energy resource systems 530 — Determine a net DC load corresponding to the DC loads 540 — Determine a net AC load corresponding to the AC loads 550 — Dispatching power from the plurality of energy resource systems to the DC loads and the AC loads

FIG. 5

DISTRIBUTED OPTIMIZATION FOR HYBRID AC-DC MICROGRID

TECHNICAL FIELD

The present disclosure relates generally to microgrids and, for example, to a microgrid controller configured to control or manage an operation of a microgrid.

BACKGROUND

A microgrid is a self-sufficient energy system that serves a particular geographic area, such as a college campus, a hospital complex, a business center, a neighborhood, a mining site, a drilling site, and/or the like. Within a microgrid are one or more kinds of distributed energy resources (DERs) (e.g., solar panels, wind turbines, fuel cells, photovoltaic (PV) cells, generators, energy storage devices (e.g., batteries, capacitors), and/or other energy sources) that produce power for the microgrid. Some microgrids are configured as off-grid electrical power distribution systems (e.g., stand-alone microgrids or islands) that do not connect to a larger electrical power distribution system (e.g., a macrogrid) run by, for example, an electric utility or power plant. Some microgrids are able to operate in a grid-connected mode and/or in a stand-alone mode. In a grid-connected mode, a microgrid may operate connected to and synchronous with the larger electrical power distribution system. In a stand-alone mode, the microgrid may be disconnected from the larger electrical power distribution system and operate as a stand-alone microgrid. A microgrid controller may control whether the microgrid operates in the grid-connected mode or in the stand-alone mode, for example, based on a schedule or based on one or more conditions being satisfied.

A microgrid may include different types of loads and different types of DERs with different power characteristics. For example, some loads, such as electric vehicles, may be direct current (DC) loads, and some loads, such as heating, ventilation, and air conditioning (HVAC) systems and appliances, may be alternating current (AC) loads. Additionally, some DERs, such as PV cells, fuel cells, and energy storage devices, may supply DC power, and some DERs, such as generator sets (e.g., diesel engine-generators), wind turbines, and utilities, may supply AC power. Thus, the microgrid may be a hybrid AC-DC microgrid that includes one or more DC buses for distributing DC power and one or more AC buses for distributing AC power. Many microgrid systems do not have an efficient way to manage all types of loads and all types of DERs in a hybrid AC-DC microgrid in which DC power supplies, DC power demands, AC power supplies, and AC power demands are dynamically changing.

U.S. patent publication 2023/0307922 ("the '922 publication") discloses a method and system for microgrid control. The system of the '922 publication includes a controller that receives data from project site components and then controls the components based on the received data. The system monitors load demand and generates controls signals to control the power generating components to supply the necessary power to support load demand. The power generating components may include a battery, a solar/wind power generation device, or a diesel generator. However, the '922 publication does not disclose how to optimize a hybrid AC-DC microgrid for efficient dispatch and utilization of DC power and AC power.

The microgrid system of the present disclosure solves one or more of the problems set forth above and/or other problems in the art.

SUMMARY

A microgrid system may include a plurality of energy resource systems configured to supply power to a microgrid, wherein the plurality of energy resource systems includes DC energy resource systems configured to supply DC power, and AC energy resource systems configured to supply AC power; a plurality of local controllers, wherein each local controller of the plurality of local controllers is associated with a respective energy resource system of the plurality of energy resource systems, for controlling the respective energy resource system; a plurality of power buses configured to deliver power from the plurality of energy resource systems to one or more loads; and a microgrid controller, wherein each local controller is configured to determine an available output power for a respective energy resource system based on one or more operational constraints, and transmit an indication of the available output power to the microgrid controller, and wherein the microgrid controller is configured to determine, based on the available output power indicated by each local controller, a net available DC output power available from the DC energy resource systems and a net available AC output power available from the AC energy resource systems.

A method for optimizing a hybrid microgrid including DC loads and AC loads may include receiving, by a microgrid controller, energy resource information from each energy resource system of a plurality of energy resource systems, wherein the plurality of energy resource systems includes DC energy resource systems configured to supply DC power, and AC energy resource systems configured to supply AC power, and wherein the energy resource information includes an available output power; determining, by the microgrid controller, based on the available output power indicated by each energy resource system, a net available DC output power available from the DC energy resource systems and a net available AC output power available from the AC energy resource systems; determining, by the microgrid controller, a net DC load corresponding to the DC loads; determining, by the microgrid controller, a net AC load corresponding to the AC loads; dispatching, by the microgrid controller, power from the plurality of energy resource systems to the DC loads and the AC loads, including prioritizing the net available DC output power to the DC loads for satisfying at least a portion of the net DC load, and prioritizing the net available AC output power to the AC loads for satisfying at least a portion of the net AC load; and after satisfying the net DC load, dispatching, by the microgrid controller, a remaining DC portion of the net available DC output power to the AC loads for satisfying at least an additional portion of the net AC load, or after satisfying the net AC load, dispatching, by the microgrid controller, a remaining AC portion of the net available AC output power to the DC loads for satisfying at least an additional portion of the net DC load.

BRIEF DESCRIPTION OF THE DRAWINGS

FIG. 5 is a flowchart of an example process associated with distributed optimization for a hybrid AC-DC microgrid.

DETAILED DESCRIPTION

Figure 1:
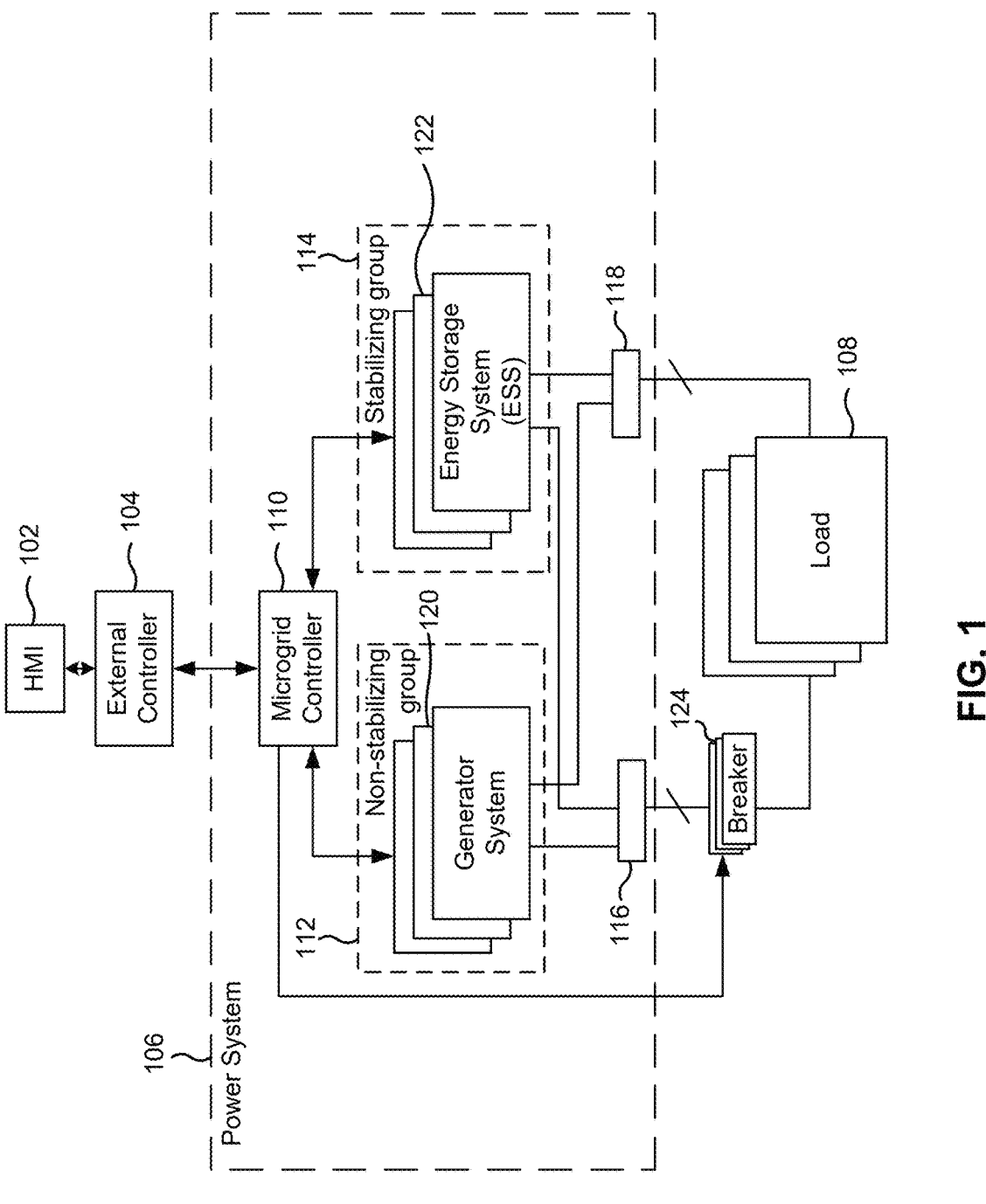
FIG. 1 shows a system according to one or more implementations.

This disclosure relates to a power distribution system, and is applicable to any system that distributes and/or receives power via a power grid. Some aspects relate to a microgrid controller that is configured to control one or more components and/or systems associated with the microgrid, including energy resource systems and/or loads. The microgrid controller may control a state of the microgrid based on one or more conditions being satisfied.

Many microgrid systems do not have an efficient way to manage all types of loads and all types of DERs in a hybrid AC-DC microgrid in which DC power supplies, DC power demands, AC power supplies, and AC power demands are dynamically changing. For example, for microgrids with DC-coupled DERs connected to an AC grid, handling optimization problems using AC grid constraints ignores DC grid constraints, such as branch flow limits, DC parameters, and DC side losses. Ignoring the DC grid constraints may result in sub-optimal DC power flow and reduced energy efficiency. Similarly, for microgrids with AC-coupled DERs connected to a DC grid, handling optimization problems using DC grid constraints ignores AC grid constraints, which may result in sub-optimal AC power flow and reduced energy efficiency.

In addition, for a microgrid with a centralized controller that handles (e.g., processes) all optimization problems, issues may arise with scheduling DC-coupled DERs during a stand-alone mode, during which the microgrid is disconnected from a larger electrical power distribution system (e.g., a macrogrid). For example, processing all optimization problems for all DERs is computationally demanding. The microgrid controller may be limited in processing bandwidth and other processing resources that may create a bottleneck when the microgrid controller is designed to handle all optimization problems. In some instances, some processing tasks may need to be handled in parallel in order to optimize the performance of the microgrid, which may not be possible due to processing constraints of the microgrid controller. In other instances, conflicts may arise in which certain processing tasks should be prioritized over other processing tasks, leading to inefficiencies. Thus, due to the processing constraints, the microgrid controller may become inundated with processing tasks and may not be able to appropriately handle all tasks with optimal timing.

Some implementations disclosed herein provide a microgrid system that may include a microgrid controller configured as a central computing resource, distributed local controllers configured as distributed computing resources, and an aggregator, that operate in combination to optimize performance in a hybrid AC-DC microgrid. Each local controller of the distributed local controllers may be configured to control a respective DER of a plurality of DERs. The distributed local controllers may be configured to perform parallel computing to process data to solve respective optimization problems. For example, each local controller may process data and solve respective optimization problems associated with a respective DER. Thus, the distributed local controllers may perform processing and optimization sub-tasks (e.g., local-level processing tasks) that may be typically handled by a centralized controller, such as the microgrid controller.

By handling the processing and optimization sub-tasks, the distributed local controllers may reduce a processing demand on (e.g., reduce a computational load of) the microgrid controller that would typically be used for performing the processing and optimization sub-tasks. As a result, the microgrid controller may dedicate its own processing resources to performing system-level processing tasks and system-level monitoring and control, as opposed to local-level processing tasks, monitoring, and control. The distributed local controllers may enable more efficient handling of local-level tasks at the distributed local controllers and system-level tasks at the microgrid controller. For example, the distributed local controllers may enable the microgrid system to handle processing tasks in a more efficient manner, by overcoming the processing constraints of a centralized controller.

In some implementations, the aggregator may enable iterative coordination between the distributed local controllers and the microgrid controller. The aggregator may be a cloud-based aggregator communicatively coupled between the distributed local controllers and the microgrid controller, or may be integrated in the microgrid controller as a separate processing module. The aggregator may be configured to facilitate an information exchange between the distributed local controllers and a main processor of the microgrid controller. The aggregator may enable communications over a communication protocol, such as a Modbus or controller area network (CAN) protocol, for optimized control of the DERs and the loads of the microgrid.

Accordingly, the microgrid system may address problems that exist in microgrids that have DC-coupled DERs connected to an AC grid. For example, when a power flow is optimized using AC grid constraints only, DC branch flow limits, DC side losses, and other DC parameters are ignored. This can lead to sub-optimal power flow and reduced energy efficiency. Moreover, scheduling DC-coupled DERs during stand-alone mode becomes challenging when AC optimization is performed in a centralized manner using a single centralized controller. The microgrid system disclosed herein may use parallel computing, by way of the distributed local controllers, to solve sub-problems efficiently. The sub-problems may be optimization problems for optimizing an operation or a functionality of a DER. In addition, the aggregator may provide iterative coordination by establishing information exchange between the distributed local controllers and the microgrid controller. The iterative coordination may enable both AC constraints and DC constraints to be considered for optimizing operations of DC-coupled DERs, AC-coupled DERs, DC loads, and AC loads provided in the hybrid AC-DC microgrid to utilize DC power and AC power efficiently. By deploying a hybrid AC-DC distributed optimization scheme, power flow can be optimized, in consideration with both AC and DC constraints, leading to improved energy efficiency and effective scheduling of DC-coupled and AC-coupled DERs in various operating modes, including grid-connected mode and stand-alone mode.

The microgrid system, configured with the hybrid AC-DC distributed optimization scheme, may be scalable and adaptable for different microgrid applications (e.g., mining, construction, and utility power) with DC-coupled DERs used for power generation. The microgrid system, configured with the hybrid AC-DC distributed optimization scheme, may help to improve power flows in a hybrid AC-DC microgrid, by taking DC and AC constraints into consideration. Thus, power generation may be optimized to meet a net load, resulting in economical and reliable operation. The microgrid system, configured with the hybrid AC-DC distributed optimization scheme, may optimize scheduling and power flow in both the grid-connected mode and the stand-alone mode. The microgrid system, configured with the hybrid AC-DC distributed optimization scheme, may avoid relying on one single centralized controller, subject to single point of failure. Instead, the microgrid system may use a local controller at each DER to optimize an operation of each DER using a distributed approach employing parallel computing. The microgrid system, configured with the hybrid AC-DC distributed optimization scheme, may adapt to dynamic system constraints based on an availability of one or more DERs to supply power and/or based on one or more types of loads connected to the microgrid. The microgrid system, configured with the hybrid AC-DC distributed optimization scheme, may achieve optimization at a local level and a system level using the aggregator. The microgrid system, configured with the hybrid AC-DC distributed optimization scheme, may provide a non-hierarchical agent-based distributed optimization that is computed within or outside of the microgrid controller.

FIG. 1 shows a system 100 according to one or more implementations. The system 100 may include a human-machine interface (HMI) 102, an external controller 104, a power system 106, and one or more loads 108.

The power system 106 may be a microgrid or other type of electrical power distribution system that may provide power to the one or more loads 108. In some cases, the power system 106 may be an off-grid electrical power distribution system. In some cases, the power system 106 may be configurable to operate in a grid-connected mode and in a stand-alone mode. The power system 106 may include a microgrid controller 110, a non-stabilizing group of energy resource systems 112 (e.g., a non-stabilizing group of DERs), a stabilizing group of energy resource systems 114 (e.g., a stabilizing group of DERs), and interfaces 116 and 118. Generally, "off-grid" may mean that the electrical power distribution system is not connected to a larger electrical power distribution system run by, for example, an electric utility or other large-scale electric power generation plant that serves electricity to a geographic area, campus, compound, etc. However, techniques disclosed herein may still be applied to electrical power distribution systems that are connected to larger electrical power distribution systems. For instance, the larger electrical power distribution systems may operate as a power source in a primary provider role or secondary provider role, while the power system 106 may operate as a power source in the other of the primary provider role or secondary provider role.

The non-stabilizing group of energy resource systems 112 may include one or more energy generator systems 120. Each energy generator system 120 may include a power generator (e.g., an engine-generator, a fuel cell, a PV cell, or other power generating system) and a local generator controller communicatively coupled to the microgrid controller 110. Thus, each energy generator system 120 may generate power from a respective power source. Each local generator controller may control how much power a respective power generator generates, control a rate of power distribution, and/or obtain status information corresponding to the respective power generator. Each local generator controller may be controlled by the microgrid controller 110.

The stabilizing group of energy resource systems 114 may include one or more energy storage systems (ESSs) 122. Each energy storage system 122 may include an electric storage device (e.g., one or more batteries and/or capacitors) and a local ESS controller communicatively coupled to the microgrid controller 110. Each local ESS controller may control a flow of power into or out of a respective electric storage device, including charging of the respective electric storage device and discharging of the respective electric storage device, control a rate of power flow, and/or obtain status information corresponding to the respective electric storage device, such as state-of-charge (SOC), state-of-health (SOH), discharge limit, and other device parameters. Each local ESS controller may be controlled by the microgrid controller 110.

The system 100 may also include one or more breakers 124 (e.g., distribution breakers or switches) that may be individually controlled by the microgrid controller 110 to connect a respective load 108 to the power system 106 or disconnect the respective load 108 from the power system 106. The one or more breakers 124 may be part of one or both interfaces 116 and 118.

The HMI 102 may include one or more processors, and may be configured to receive and process one or more inputs from a user, such as an operator. Additionally, the HMI 102 may be configured to provide one or more prompts or outputs to the user. Thus, the HMI 102 may be a user terminal configured to interact with a user to process information and/or commands provided by the user, provide information to the user (e.g., status information), and/or perform one or more tasks or functions in response to processing the information and/or commands provided by the user. The HMI 102 may be communicatively coupled to the external controller 104, which may be communicatively coupled to the microgrid controller 110. In some implementations, the HMI 102 may be communicatively coupled directly to the microgrid controller 110. The external controller 104 may send commands to and receive information from the microgrid controller 110. For example, the external controller 104 may send commands to the microgrid controller 110 based on information received from the HMI 102. Thus, the external controller 104 may be a user-commanded controller. The external controller 104 may be integrated with the HMI 102. The external controller 104 may be a controller of a larger electrical power distribution system (e.g., a macrogrid, a power generation plant, and/or electric utility provider).

The power system 106 may provide electrical power to the one or more loads 108. Generally, the power system 106 may provide alternating current (AC) power at a particular voltage and a particular current. The microgrid controller 110 may control one or more energy storage systems 122 to instantaneously inject power when power is needed by the power system 106 or instantaneously absorb surplus power generated by the power system 106. Accordingly, one of more electric storage devices of the energy storage systems 122 may act as a power consumer on one or more energy generator systems 120 or as a power source for the one or more energy generator systems 120, to thereby ensure that system bus frequencies of the non-stabilizing group of energy resource systems 112 are maintained at a nominal value. In other words, the microgrid controller 110 may control the stabilizing group of energy resource systems 114 to stabilize loads of the non-stabilizing group of energy resource systems 112 in order to maintain the non-stabilizing group of energy resource systems 112 at a relatively constant load, which may reduce a recurrence of frequency deviations from the nominal value.

The microgrid controller 110 may be integrated with, or separate from (but connected to), the interfaces 116 and 118, the energy generator systems 120, and the energy storage systems 122, or combinations thereof. In this manner, a user may, through interaction with the HMI 102, add or remove energy generator systems 120 to increase/reduce system power generation and/or add or remove energy storage systems 122 to increase/reduce system energy storage capacity, in accordance with a user's preference. For instance, a user may prefer to add additional energy generator systems 120 and/or add additional energy storage systems 122 to increase load capacity if additional loads 108 are expected to be connected to the power system 106, or remove energy generator systems 120 and/or remove energy storage systems 122 to decrease load capacity if loads 108 are expected to be disconnected from the power system 106. Additionally, the microgrid controller 110 may be configured to add or remove energy generator systems 120 and/or add or remove energy storage systems 122 from the power system 106 based one or more conditions being satisfied. In some cases, the microgrid controller 110 may be configured to add or remove energy generator systems 120 and/or add or remove energy storage systems 122 from the power system 106 based on a schedule.

The one or more loads 108 may be any device that can connect to a power distribution system, such as the power system 106, to receive electrical power. Examples of loads may include heavy machinery (e.g., electric mining machines, haulers, etc.), personal devices, appliances, heating, ventilation, and air conditioning (HVAC) systems, industrial drills, personal residence electrical distribution systems, etc. The loads 108 may include one or more non-stable loads, such as one or more cyclic loads. The loads 108 may include unidirectional loads (e.g., loads that can only receive power from the power system 106), bi-directional loads (e.g., loads that can both receive power from the power system 106 and provide power to the power system 106), charging loads (e.g., loads that include a chargeable electric battery), essential loads (e.g., loads that require uninterrupted service), and/or non-essential loads (e.g., loads that do not require uninterrupted service). Loads may be assigned different priorities based on load type, load classification, and/or operation state or mode.

Generally, the one or more loads 108 may receive the power from the power system 106 and use the power in accordance with the operations of the one or more loads 108. Users of the power system 106 and the one or more loads 108 may connect/disconnect the one or more loads 108 by electrically connecting the one or more loads 108 to the interfaces 116 and 118 of the power system 106. For instance, the interfaces 116 and 118 may have AC plugs/sockets to connect the one or more loads 108 in parallel to the one or more energy generator systems 120 and the one or more energy storage systems 122 of the power system 106. One or more loads 108 may include a local load controller that may collect load information and transmit the load information to the microgrid controller 110. Load information may include information indicating a load type, a load classification, and/or an operation state or mode of a load 108. The loads can be active (real) or reactive to allow for a power quality-based approach to scheduling. Load information may include load data of a load, such as maximum load and minimum load. For chargeable loads, load information may include maximum charging load, maximum state of charge, minimum state of charge, current state of charge, and usable discharge energy as a function of the current state of charge. Load information may be received by the microgrid controller 110 via the interfaces 116 and 118, which may include one or more communication interfaces coupled to the microgrid controller 110.

The interfaces 116 and 118 may also have a plurality of generator connections and a plurality of energy store connections. The plurality of generator connections may be hardwired electrical connections and/or AC plugs/sockets to connect the one or more energy generator systems 120 in parallel to the at least one load 108 and the one or more energy storage systems 122. The plurality of energy store connections may be hardwired electrical connections and/or AC plugs/sockets to connect the one or more energy storage systems 122 in parallel to the one or more loads 108 and the one or more energy generator systems 120. For instance, the power system 106 may or may not allow addition/removal of energy generator systems 120 and/or addition/removal of energy storage systems 122. Therefore, depending on a configuration, the interfaces 116 and 118 may include: (1) hardwired electrical connections that connect the at least one energy generator system 120; (2) AC plugs/sockets to connect/disconnect the at least one energy generator system 120; (3) hardwired electrical connections that connect the at least one energy storage system 122; and/or (4) AC plugs/sockets to connect/disconnect the at least one energy storage system 122. The interfaces 116 and 118 may be coupled to a system bus (e.g., a power bus) of the power system 106. The system bus may enable one of more of the energy storage systems 122 to absorb power from one or more energy generator systems 120 and/or one or more loads 108 (e.g., for charging and/or storing power).

The one or more energy generator systems 120 may also include communication interfaces. The communication interfaces of the one or more energy generator systems 120 may enable the one or more energy generator systems 120 to communicate with the microgrid controller 110. For instance, the one or more energy generator systems 120 may be connected to the microgrid controller 110 by wired or wireless communication. The one or more energy generator systems 120 may provide the microgrid controller 110 with generator data (e.g., energy resource information). The generator data, for each of the one or more energy generator systems 120, may include load data and/or generator parameters. The load data may include a current (e.g., instantaneous) load seen by the one or more energy generator systems 120 and/or past load data (if one or more energy generator systems 120 store such data locally). The current load/past load data may include voltage (e.g., in volts) and/or current (e.g., in amperes) measured by one or more sensor components included in an energy generator system 120. The generator parameters may include a generator set maximum threshold value and a generator set minimum threshold value. Alternatively, to reduce transmission bandwidth, the generator data may omit the generator parameters, and the one or more energy generator systems 120 may transmit the generator parameters during an initial configuration process between the one or more energy generator systems 120 and the microgrid controller 110. The generator set maximum threshold value and the generator set minimum threshold value may indicate a maximum power load and a minimum power load, respectively, that a generator of an energy generator system 120 may support.

The one or more energy storage systems 122 may be any energy storage device that can store and output AC power. For instance, the one or more energy storage systems 122 may include at least one electrical-chemical energy storage (e.g., a battery), electrical energy storage (e.g., a capacitor, a supercapacitor, or a superconducting magnetic energy storage), mechanical energy storage (e.g., a fly wheel, a pump system), and/or any combination thereof. The one or more energy storage systems 122 may include inverters (individually or collectively) so that the one or more energy storage systems 122 may operate as a power consumer or a power source. The one or more energy storage systems 122 may also include electronic control mechanisms to control (1) how much load the one or more energy storage systems 122 draw, or (2) how much AC power the one or more energy storage systems 122 output.

The one or more energy storage systems 122 may also include communication interfaces. The communication interfaces of the one or more energy generator systems 120 may enable the one or more energy storage systems 122 to communicate with the microgrid controller 110. For instance, the one or more energy storage systems 122 may be connected to the microgrid controller 110 by wired or wireless communication. The one or more energy storage systems 122 may provide the microgrid controller 110 with energy storage data (e.g., energy resource information) and may receive instructions from the microgrid controller 110.

The energy storage data may include, for each of the at least one energy store, a current energy level (e.g., kilowatt-hours currently stored), total energy storage capacity (e.g., kilowatt-hours of capacity), and/or discharge/charge parameters. The current energy level may be measured by a battery meter of an energy storage. The battery meter may one or combinations of a voltmeter, an amp-hour meter, and/or an impedance-based meter. The discharge/charge parameters may indicate an amount of discharge power and an amount of charge power for a respective energy storage device of the one or more energy storage systems 122. Alternatively, to reduce transmission bandwidth, the energy storage data may omit the discharge/charge parameters, and the one or more energy storage systems 122 may transmit the discharge/charge parameters when the one or more energy storage systems 122 are first connected to the microgrid controller 110.

The one or more energy storage systems 122 may receive requests (e.g., instructions) for the energy storage data to provide the energy storage data and/or continuously provide the energy storage data to the microgrid controller 110. The instructions may include energy storage dispatch (ESD) instructions. An ESD instruction may include an instruction to inject power to a system bus of the power system 106 or absorb power from the system bus of the power system 106. ESD instructions may be provided in control signals (e.g., communication signals that provide the ESD instructions). At least one ESD instruction may be utilized to rapidly stabilize the load, thereby stabilizing the bus frequency of the power system 106 in a time efficient manner, rather than attempting to stabilize the load using the one or more energy generator systems 120 alone. The one or more energy storage systems 122 may control the inverters and the electronic control mechanisms to control (1) quantity of load drawn by the one or more energy storage systems 122, or (2) the amount of AC power output produced by the one or more energy storage systems 122, in accordance with the ESD instructions. Reactive and/or active may be used as a qualifier for loads, where reactive loads may contribute to a stabilization algorithm in addition to the active or real loads.

The microgrid controller 110 may include at least one memory device (e.g., one or more memories) for storing instructions (e.g., program code); at least one processor for executing the instructions from the memory device to perform a set of desired operations; and a communication interface (e.g., coupled to a communication bus) for facilitating the communication between various system components. The instructions may be computer-readable instructions for executing a control application. The communication interface of the microgrid controller 110 may enable the microgrid controller 110 to communicate with the one or more energy generator systems 120 and the one or more energy storage systems 122. The microgrid controller 110, while executing the control application, may receive the generator data and the energy storage data (e.g., energy resource information), process the generator data and the energy storage data to generate one or more ESD instructions, and output the ESD instructions to one or more energy generator systems 120 and/or to one or more energy storage systems 122.

To process the generator data and the energy storage data to generate the ESD instructions, the control application may include a load stabilization function and/or an SOC function. The control application may also include a generator set limit function and/or energy store discharge/charge limit function to generate the ESD instruction. In some cases, the load stabilization function may be activated while the power system 106 is configured in stand-alone mode in order to provide off-grid load stabilization. The microgrid controller 110 may automatically activate or deactivate the aforementioned system functions based on a presence or an absence of system parameters (such as no generator set minimum threshold value being available, etc.) or one or more system conditions being satisfied.

Generally, the load stabilization function may ensure that system bus frequencies of the one or more energy generator systems 120 are maintained at a nominal value by causing an amount of power to be absorbed/injected by the one or more energy storage systems 122. The amount of power may be determined based on a difference from an instantaneous load and a moving average of the load. Meanwhile, the SOC function may ensure that the one or more energy storage systems 122 are charged to a target SOC or a target SOC range such that a SOC of one or more energy storage systems does not drift too low or too high, outside of a desired operating range (e.g., the target SOC range). The target SOC or the target SOC range may enable the at least one energy storage system 122 to provide long term beneficial use to the system 100, such as having a range of operation usable by the power system 106 and/or avoid degradation ranges of the one or more energy storage systems 122.

One or more energy generator systems 120 may include an engine-generator (e.g., a genset) that provides AC power to the power system 106, which may provide the AC power to the at least one load 108. Generally, an engine-generator may be any device that converts motive power (mechanical energy) into electrical power to output the AC power. An engine-generator may be a gas turbine electrical generator. In such gas turbine electrical generators, fast changes in load from the at least one load 108 may cause a system bus frequency to deviate from a nominal value. The system bus frequency may be a frequency of electrical components of the generator. For instance, such gas turbine electrical generators may have isochronous frequency control governors that may try to maintain the system bus frequency to the nominal value in response to changes of the load of the one or more loads 108. Therefore, during a transient load charge (e.g., a load transient), the system bus frequency may change as the load on the engine-generator changes. However, a rate of return of the system bus frequency back to the nominal value is slower than a desired rate due to an inertia of motion of physical components (e.g., a rotor of a stator-rotor) of the engine-generator. The slow rate of return may reduce power quality of the power system 106. The power quality of the power system 106 may be determined based on the voltage, frequency, and waveform of the power output to the one or more loads 108. A high power quality may ensure continuity of service for the one or more loads 108, such that the one or more loads 108 are able to properly function as intended. A low power quality may cause the one or more loads 108 to malfunction, fail prematurely, or not operate at all.

Therefore, avoiding load transients may be beneficial in providing better power quality. However, generally, controlling a load of the one or more loads 108 may not be possible or desirable. Instead, the microgrid controller 110 may control the one or more energy storage systems 122 of the stabilizing group of energy resource systems 114 to act as a power consumer or as an energy source, so that the one or more energy generator systems 120 of the non-stabilizing group of energy resource systems 112 may maintain the system bus frequency at the nominal value, thereby ensuring better power quality.

Figure 2:
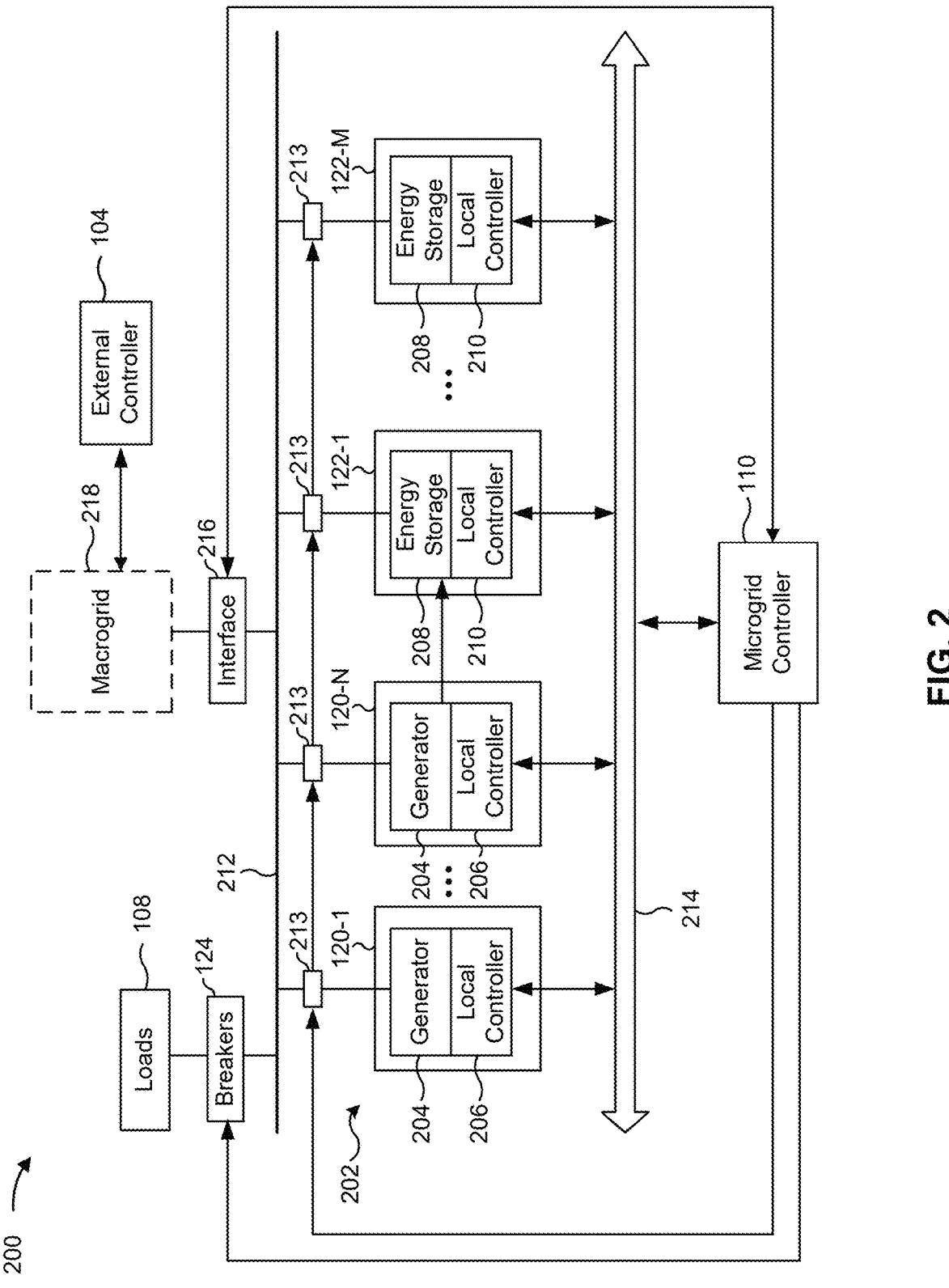
FIG. 2 shows a microgrid according to one or more implementations.

FIG. 2 shows a microgrid 200 according to one or more implementations. The microgrid 200 may be an example of the power system 106 described in connection with FIG. 1. The microgrid 200 may include a plurality of DERs 202. The plurality of DERs 202 may include N energy generator systems 120 and M energy storage systems 122, where N and M are integers greater than zero. For example, the plurality of DERs 202 may include a first energy generator system 120-1 and an $N^{th}$ energy generator system 120-N. Additionally, the plurality of DERs 202 may include a first energy storage system 122-1 and an $M^{th}$ energy storage system 122-M. Each energy generator system 120 may include a power generator 204 and a local generator controller 206. Each energy storage system 122 may include an electric storage device 208 (e.g., one or more batteries and/or capacitors) and a local ESS controller 210.

Each energy generator system 120 may be coupled to a power bus 212 for providing power to one or more loads connected to the power bus 212. Additionally, each energy storage system 122 may be coupled to the power bus 212 for providing power to or absorbing power from the power bus 212 (e.g., for providing power to or absorbing power from one or more components, such as one or more loads and/or one or more energy generator systems 120 connected to the power bus 212).

The microgrid 200 may also include the microgrid controller 110 that is communicatively coupled to the local controllers (e.g., local generator controllers 206 and local ESS controllers 210) of each DER 202 across a communication bus 214. The communication bus 214 may also enable the microgrid 200 to communicate with one or more loads and/or one or more load management systems (e.g., charging systems, fleet management systems, local load controllers, etc.). In some cases, two or more communication buses 214 may be provided. For example, one communication bus may be provided to communicate with local controllers and another communication bus may be provided to communicate with one or more loads and/or one or more load management systems.

Each local generator controller 206 may include any appropriate hardware, software, and/or firmware to sense and control a respective power generator 204, and send information to, and receive information, from microgrid controller 110. For example, a local generator controller 206 may be configured to sense, determine, and/or store generator data of its respective power generator 204. The generator data may be sensed, determined, and/or stored in any conventional manner. Each local generator controller 206 may control whether a respective power generator 204 is connected to or disconnected from the power bus 212 (for example, based on an instruction or a control signal received from the microgrid controller 110).

Each local ESS controller 210 may include any appropriate hardware, software, and/or firmware to sense and control a respective electric storage device 208, and send information to, and receive information, from microgrid controller 110. For example, a local ESS controller 210 may be configured to sense, determine, and/or store various characteristics of its respective electric storage device 208. Such characteristics of the respective electric storage device 208 may include, among others, a current SOC, a current energy, an SOC minimum threshold, an SOC maximum threshold, and a discharge limit of the respective electric storage device 208. These characteristics of each respective electric storage device 208 may be sensed, determined, and/or stored in any conventional manner. Each local ESS controller 210 may control whether a respective electric storage device 208 is connected to or disconnected from the power bus 212 (for example, based on an instruction or a control signal received from the microgrid controller 110).

The microgrid controller 110 may receive or determine a need for charging or discharging of power from the microgrid 200, and may be configured to determine and send signals to allocate a total charge request and/or total discharge request across all of the plurality of DERs 202.

When performing the power allocation functions, the microgrid controller 110 may allocate a certain amount of power from each energy generator system 120 to one or more loads 108. The one or more loads 108 may be connected to the power bus 212 via one or more breakers 124 to receive power from the power bus. When performing the power allocation functions, the microgrid controller 110 may allocate a total charge request and/or a total discharge request across the energy storage systems 122 as a function of a usable energy capacity of each energy storage system 122. The usable energy capacity corresponds to the capacity or amount of energy that an energy storage system 122 can receive in response to a total charging request (usable charge energy), or the capacity or amount of energy that an energy storage system can discharge in response to a total discharge request (usable discharge energy). The usable charge energy is a function of a maximum state of charge, current state of charge, and current energy of the energy storage system, and the usable discharge energy is a function of a minimum state of charge, and current energy of the energy storage system 122. The microgrid controller 110 may determine a usable charge/discharge capacity of each energy storage system 122 (e.g., SOC), a desired charge/discharge of each energy storage system 122, a remainder power of each energy storage system 122, and/or an SOH of each energy storage system 122.

Thus, the microgrid controller 110 regulates a power supply of the microgrid 200 such that an exact amount of desired power flows into or out of the power system 106 at any given time. The microgrid controller 110 may regulate the power supply of the microgrid 200 in cooperation with the local generator controllers 206 and the local ESS controllers 210. The microgrid controller 110 may transmit control signals (e.g., instructions) to the local generator controllers 206 and the local ESS controllers 210 to activate (e.g., to bring online), deactivate (to bring offline), or curtail (limit or regulate to a target output) one or more of the DERs 202. Additionally, or alternatively, the microgrid controller 110 may transmit control signals to one or more switches 213 may be to control a switch state (e.g., an on state or an off state) of the one or more switches 213, for example, to connect one or more DERs 202 to or disconnect one or more DERs 202 from the microgrid 200 (e.g., the power bus 212). The switches 213 may be integrated in one or both interfaces 116 and 118 described in connection with FIG. 1.

In some cases, two or more power buses 212 may be provided. For example, a power bus may be provided to couple one or more power generators 204 to one or more electric storage devices 208 for charging the one or more electric storage devices 208. For example, the microgrid controller 110 may selectively couple a power generator 204 to an electric storage device 208 to charge the electric storage device 208. Thus, the power bus 212 may be part of a power distribution network of the microgrid 200 that may include one or more power buses used to distribute power between loads 108 and/or DERs 202.

The microgrid 200 may include an interface 216 for connecting the microgrid 200 to and disconnecting the microgrid 200 from an electrical power distribution system 218, such as a macrogrid. The electrical power distribution system 218 may include the external controller 104 (e.g., a macrogrid controller), as described in connection with FIG. 1. The external controller 104 may be coupled to the interface 216 for transmitting control signals, such as instructions or requests, to the microgrid controller 110. The interface 216 may include one or more electrical connections used for connecting the microgrid 200 to the electrical power distribution system 218. The interface 216 may include one or more switches or breakers that are controlled by the microgrid controller 110 for connecting the microgrid 200 to and disconnecting the microgrid 200 from the electrical power distribution system 218. For example, the one or more switches or breakers of the interface 216 may connect the power bus 212 (or another system bus) to or disconnect the power bus 212 (or another system bus) from the electrical power distribution system 218. Thus, the microgrid controller 110 may configure the microgrid 200 to operate in a grid-connected mode by connecting the microgrid 200 to the electrical power distribution system 218 or in a stand-alone mode by disconnecting the microgrid 200 from the electrical power distribution system 218.

Figure 3:
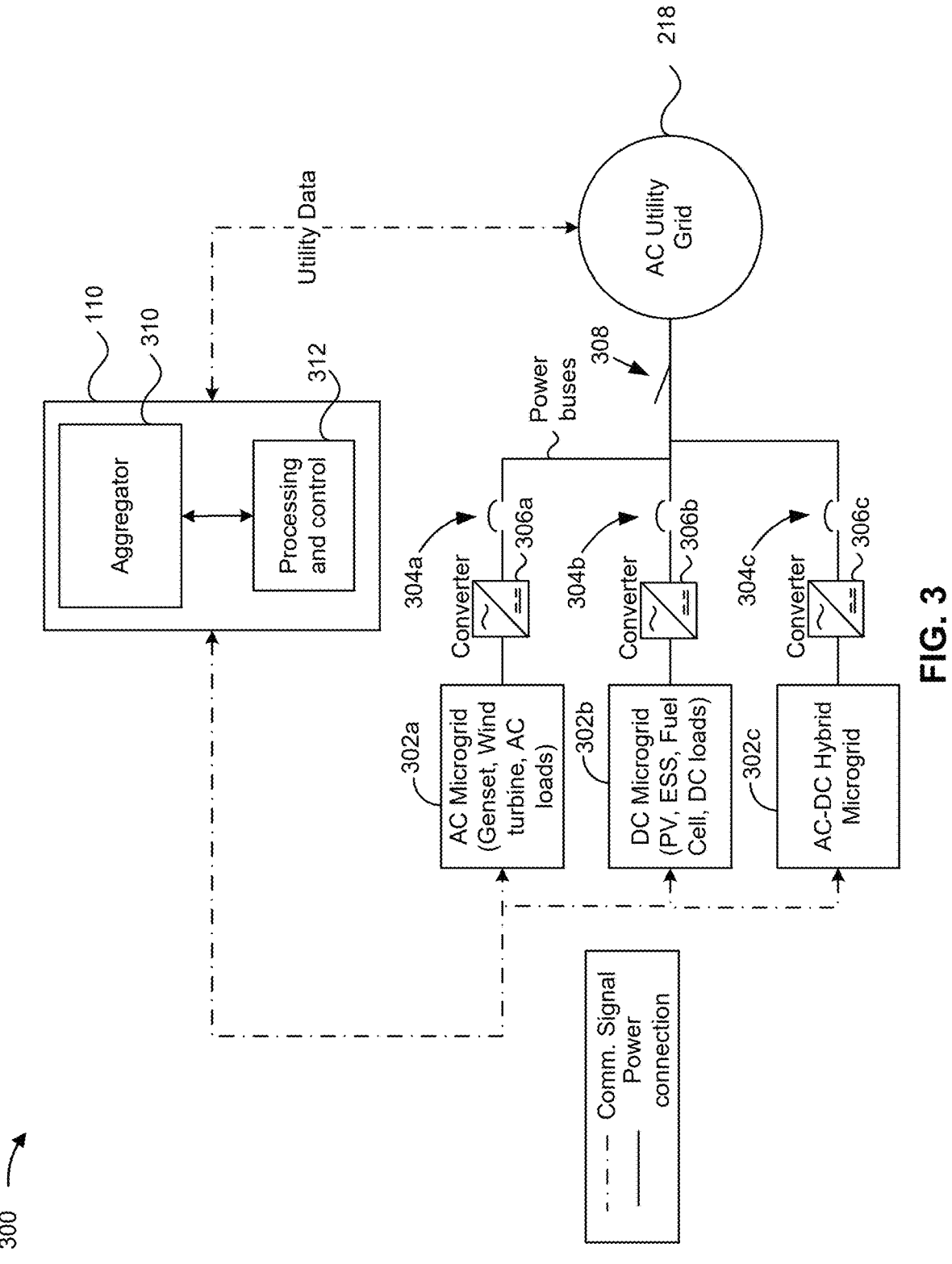
FIG. 3 shows a system according to one or more implementations.

FIG. 3 shows a system 300 according to one or more implementations. The system 300 may include the microgrid controller 110 described in connection with FIGS. 1 and 2. In addition, the system 300 includes one or more microgrids, including an AC microgrid 302a, a DC microgrid 302b, and/or an AC-DC hybrid microgrid 302c. The AC microgrid 302a may include AC loads and AC DERs (e.g., AC energy resource systems). The DC microgrid 302b may include DC loads and DC DERs (e.g., DC energy resource systems). The AC-DC hybrid microgrid 302c may include AC loads, AC DERs, DC loads, and/or DC DERs. The system 300 may include switches 304a, 304b, and/or 304c that may be selectively enabled and disabled by the microgrid controller 110 to control a routing of power between the AC microgrid 302a, the DC microgrid 302b, and/or the AC-DC hybrid microgrid 302c. For example, the microgrid controller 110 may enable one or more switches 304a, 304b, and/or 304c to route AC power from the AC microgrid 302a to the DC microgrid 302b and/or the AC-DC hybrid microgrid 302c to supply one or more loads in the DC microgrid 302b and/or the AC-DC hybrid microgrid 302c. The microgrid controller 110 may enable one or more switches 304a, 304b, and/or 304c to route DC power from the DC microgrid 302b to the AC microgrid 302a and/or the AC-DC hybrid microgrid 302c to supply one or more loads in the AC microgrid 302a and/or the AC-DC hybrid microgrid 302c. The microgrid controller 110 may enable one or more switches 304a, 304b, and/or 304c to route DC power and/or AC power from the AC-DC hybrid microgrid 302c to the AC microgrid 302a and/or the DC microgrid 302b to supply one or more loads in the AC microgrid 302a and/or the DC microgrid 302b.

The system 300 may include one or more converters 306a, 306b, and/or 306c for converting power from one form into another form. For example, the one or more converters 306a, 306b, and/or 306c may include AC-to-DC converters for converting AC power to DC power, and/or DC-to-AC converters for converting DC power to AC power. An AC-to-DC converter may be used to convert AC power from the AC microgrid 302a or from the AC-DC hybrid microgrid 302c into DC power for delivery to the DC microgrid 302b. A DC-to-AC converter may be used to convert DC power from the DC microgrid 302b or from the AC-DC hybrid microgrid 302c into AC power for delivery to the AC microgrid 302a. An AC-to-DC converter and/or a DC-to-AC converter may also be used when exporting power to the AC-DC hybrid microgrid 302c, depending on the type of power being exported/imported and the type of load being supplied within the AC-DC hybrid microgrid 302c.

In some implementations, one or more power buses may be coupled to the electrical power distribution system 218 for exporting power to the electrical power distribution system 218 and/or for importing power from the electrical power distribution system 218. The one or more converters 306a, 306b, and/or 306c may be used to convert DC power to AC power for export to the electrical power distribution system 218, and/or to convert AC power from the electrical power distribution system 218 into DC power depending on the type of load being supplied (e.g., for DC loads within the DC microgrid 302b and/or the AC-DC hybrid microgrid 302c). The microgrid controller 110 may control a switch 308 for connecting the power distribution system 218 to one or more of the microgrids 302a, 302b, and/or 302c.

The microgrid controller 110 may include an aggregator 310 and a processing and control unit 312. The aggregator 310 may receive information from the microgrids 302a, 302b, and 302c, and the electrical power distribution system 218, and aggregate the information for further processing by the processing and control unit 312. For example, the aggregator 310 may receive load information from loads, such as load demand, and energy resource information from DERs, such as available output power and power type. The aggregator 310 may receive utility data, such as available import power, from the electrical power distribution system 218. Additionally, the aggregator 310 may receive export requests from the electrical power distribution system 218 for requesting power to be exported from the microgrids 302a, 302b, and 302c to the electrical power distribution system 218, and/or receive an indication of the available import power from the electrical power distribution system 218 indicating an amount of power that is available from the electrical power distribution system 218 for import to the microgrids 302a, 302b, and 302c. In some implementations, the aggregator 310 may be a cloud-based aggregator that is connected, over the internet, to a cloud network of servers, databases, and/or local controllers.

The processing and control unit 312 may process the information aggregated by the aggregator 310 for making control decisions, and generate control signals based on the control decisions. For example, the processing and control unit 312 may generate control signals for activating or deactivating one or more DERs within one or more microgrids 302a, 302b, and 302c. Additionally, or alternatively, the processing and control unit 312 may generate control signals for controlling an output power of one or more DERs. Additionally, or alternatively, the processing and control unit 312 may generate control signals for activating or deactivating one or more loads within one or more microgrids 302a, 302b, and 302c. Additionally, or alternatively, the processing and control unit 312 may generate control signals for controlling a dispatch of AC and/or DC power from one or more DERs to one or more loads. Additionally, or alternatively, the processing and control unit 312 may generate control signals for controlling a charging and a discharging of ESSs. Additionally, or alternatively, the processing and control unit 312 may generate control signals for controlling one or more switches 304a, 304b, 304c, and/or 308 to control a routing of power within the system 300, including a routing of power through one or more converters 306a, 306b, and/or 306c for power conversion, as appropriate to satisfy different types of load demands.

Figure 4:
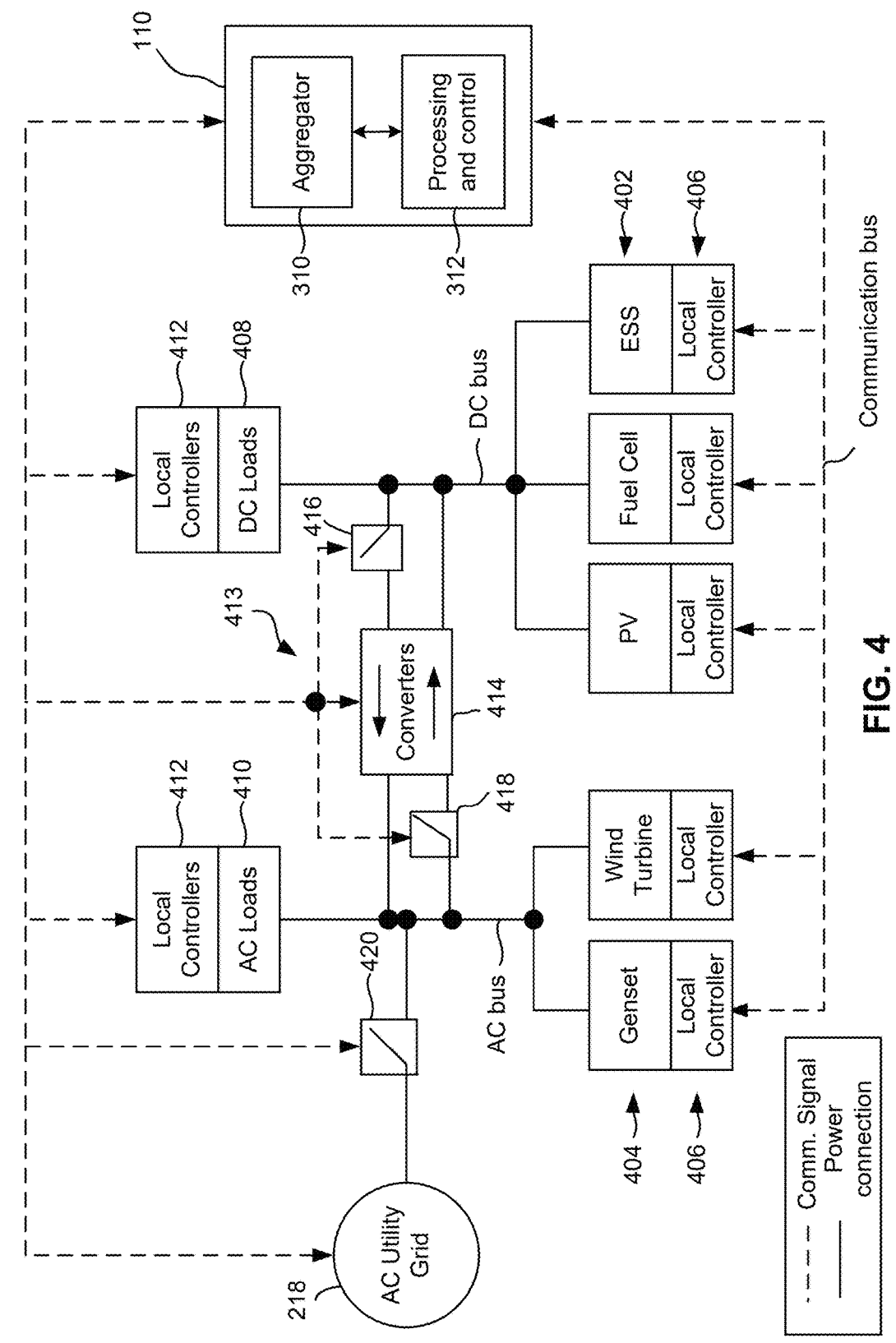
FIG. 4 shows an AC-DC hybrid microgrid according to one or more implementations.

FIG. 4 shows an AC-DC hybrid microgrid 400 according to one or more implementations. The AC-DC hybrid microgrid 400 may include the microgrid controller 110 described in connection with FIGS. 1-3. The AC-DC hybrid microgrid 400 may include a plurality of energy resource systems configured to supply power. The plurality of energy resource systems may include DC energy resource systems 402, such as PVs, fuel cells, and/or ESSs, configured to supply DC power. Additionally, or alternatively, the plurality of energy resource systems may include AC energy resource systems 404, such as gensets and/or wind turbines, configured to supply AC power.

The AC-DC hybrid microgrid 400 may include a plurality of local controllers 406 for the plurality of energy resource systems, as similarly described in connection with FIG. 2. Each local controller 406 may be associated with a respective energy resource system of the plurality of energy resource systems, for obtaining information about the respective energy resource system and controlling the respective energy resource system. The plurality of local controllers 406 may be connected to the microgrid controller 110 by one or more communication buses for exchanging information with the microgrid controller 110 and for receiving control signals from the microgrid controller 110.

The DC energy resource systems 402 may be connected to DC loads 408 by one or more DC power buses. Accordingly, the DC energy resource systems 402 may provide DC power directly to the DC loads 408. In addition, the AC energy resource systems 404 may be connected to AC loads 410 by one or more AC power buses. Accordingly, the AC energy resource systems 404 may provide AC power directly to the AC loads 410. Thus, the AC-DC hybrid microgrid 400 may include a plurality of power buses configured to deliver power from the plurality of energy resource systems to one or more loads.

The AC-DC hybrid microgrid 400 may include a plurality of local controllers 412 for the DC loads 408 and AC 410. Each local controller 412 may associated with a respective load, for obtaining information about the respective load and controlling the respective load. The plurality of local controllers 412 may be connected to the microgrid controller 110 by one or more communication buses for exchanging information with the microgrid controller 110 and for receiving control signals from the microgrid controller 110.

The microgrid controller 110 may include the aggregator 310 and the processing and control unit 312, as similarly described in connection with FIG. 3. The aggregator 310 may aggregate energy resource information received from the plurality of local controllers 406 and/or aggregate load information received from the plurality of local controllers 412. The processing and control unit 312 may process aggregated energy resource information and/or aggregated load information. The processing and control unit 312 may also generate control signals based on one or more control algorithms to optimize the AC-DC hybrid microgrid 400 based on one or more system operational constraints. For example, the processing and control unit 312 may generate control signals based on one or more control algorithms to optimize an efficiency of the AC-DC hybrid microgrid 400, to maximize a number of loads to be supported within the AC-DC hybrid microgrid 400, to operate in an efficiency mode during which all gensets are deactivated, and/or to reduce an operational cost (e.g., energy cost) of the AC-DC hybrid microgrid 400.

Each local controller 406 may obtain energy resource information from its respective energy resource system and, based on one or more operational constraints, solve an optimization problem for the respective energy resource system. The energy resource information may include measurement data measured by the local controller 406, forecast data, and/or prestored data, such as manufacturer's data associated with operational parameters of the respective energy resource system.

Energy resource information obtained by a local controller 406 may include current power output (e.g., real-time power output level in kilowatts or megawatts), maximum and minimum capacity based on current operating conditions, fuel/resource availability (e.g., fuel levels for gensets or irradiance levels for solar panels), an SoC of an ESS, an operational status (e.g., fault conditions, maintenance needs, and/or operating temperature), current operational efficiency and any losses due to impedance or other factors, and/or cost information (e.g., cost per unit of electricity generated, which may fluctuate based on fuel costs or other variables).

"Optimization problem" may refer to a mathematical calculation where a primary objective is to determine the best way to operate an energy resource system to achieve specific objectives, such as minimizing costs or emissions while satisfying load requirements and maintaining stability within the AC-DC hybrid microgrid 400. A local controller 406 may use an algorithm that defines the primary objective, such as minimizing costs, maximizing efficiency, or reducing emissions. The local controller 406 may select an algorithm from a plurality of algorithms based on an indication received from the microgrid controller 110 that indicates the primary objective.

The local controller 406 may use one or more operational constraints for performing a calculation to solve an optimization problem. Operational constraints may include conditions that a solution must satisfy, such as power output limits, resource availability, and system stability. AC operational constraints may include voltage and frequency stability to ensure that voltage and frequency levels remain within acceptable ranges, active and reactive power requirements to balance active and reactive power to maintain power quality, thermal limits of components to ensure that heating effects on cables, transformers, and other equipment do not cause temperatures to exceed one or more thresholds, and/or harmonics and power quality to ensure that harmonics do not exceed limits to avoid interference with equipment. DC operational constraints may include voltage level limits to maintain a DC bus voltage within set thresholds, voltage drop limits to restrict voltage drop across DC distribution lines, current capacity to ensure that current flows do not exceed ratings for cables and equipment, and conversion efficiency related to energy losses in DC-AC or AC-DC conversion processes. The microgrid controller 110 may select AC operational constraints and/or DC operational constraints based on a desired system configuration. Additionally, or alternatively, the microgrid controller 110 may receive AC operational constraints and/or DC operational constraints from an external controller and/or an HMI based on a desired system configuration. The microgrid controller 110 may provide the AC operational constraints to the local controllers 406 of the AC energy resource systems 404, and may provide the DC operational constraints to the local controllers 406 of the DC energy resource systems 202.

The local controller 406 may use one or more variables for performing a calculation to solve an optimization problem. The variables may include power outputs of energy resource systems, power flows, and/or factors influencing economic dispatch. An optimization problem may involve linear or nonlinear programming, depending on a complexity and interdependencies of the variables.

Each local controller 406 may parse out priority information from the energy resource information associated with the respective energy resource system, and send the priority information to the aggregator 310. The priority information may include available output power (e.g., a maximum power that the respective energy resource system can provide based on the optimization solution), a current output power (e.g., a real-time power output of the respective energy resource system), a reserve capacity (e.g., an available reserve that could be tapped into if load demand spikes), cost of generation (e.g., current marginal cost of power generation for economic dispatch), SOH, operational readiness, and/or operational limitations.

The aggregator 310 may aggregate supply and demand information to calculate total available output power and total net load for each power type (e.g., net available DC output power, net available AC output power, net DC load, and net AC load). The processing and control unit 312 may compare the total available output power and total net load for each power type. For example, the processing and control unit 312 may compare the net available DC output power and the net DC load to determine whether there is a DC power surplus or a DC power shortfall, for example, based on a difference between the net available DC output power and the net DC load. The processing and control unit 312 may compare the net available AC output power and the net AC load to determine whether there is an AC power surplus or an AC power shortfall, for example, based on a difference between the net available AC output power and the net AC load.

Additionally, the processing and control unit 312 may, based on the aggregated information, use an algorithm to allocate power across the energy resource systems in the most cost-effective way while meeting all load requirements and satisfying all operational constraints for an economic dispatch of power.

Additionally, the processing and control unit 312 may, based on the aggregated information, forecast potential needs and plan for supplementary actions (e.g., bringing additional energy resource systems online), if demand exceeds supply.

Thus, the processing and control unit 312 may, based on the aggregated information, implement a dispatch strategy to allocate the total available power from the energy resource systems based on the load demand.

For example, the aggregator 310 may determine load types, including identifying whether connected loads are DC loads 408 or AC loads 410, and calculate the net load for each power type. The processing and control unit 312 may prioritize power dispatch for each power type such that DC power is first dispatched to DC loads before being used for addressing AC loads, and such that AC power is first dispatched to AC loads before being used for addressing DC loads. Thus, the processing and control unit 312 may prioritize DC power for DC loads and may prioritize AC power for AC loads.

If a particular power type is insufficient to satisfy the net load of the same power type, the processing and control unit 312 may control a power conversion of the other power type to make up the shortfall. For example, if there is excess DC power after satisfying the net DC load, the processing and control unit 312 may convert the excess DC power into supplemental AC power and route the supplemental AC power to the AC loads 410. Alternatively, if there is excess AC power after satisfying the net AC load, the processing and control unit 312 may convert the excess AC power into supplemental DC power and route the supplemental DC power to the DC loads 408.

The AC-DC hybrid microgrid 400 may include a power transfer system 413 that includes one or more converters 414 (e.g., DC-to-AC converters and AC-to-DC converters), a transfer switch 416, and a transfer switch 418. The microgrid controller 110 may control the one or more converters 414, the transfer switch 416, and the transfer switch 418. For example, the processing and control unit 312 may enable the transfer switch 416 to route a DC power surplus from the DC bus to the one or more converters 414 for conversion into supplemental AC power. The one or more converters 414 may deliver the supplemental AC power to the AC bus for one or more AC loads 410. Thus, the power transfer system 413 may transfer the DC power surplus to an AC side of the AC-DC hybrid microgrid 400 for assisting with an AC power shortfall. Additionally, or alternatively, the processing and control unit 312 may enable the transfer switch 418 to route an AC power surplus from the AC bus to the one or more converters 414 for conversion into supplemental DC power. The one or more converters 414 may deliver the supplemental DC power to the DC bus for one or more DC loads 408. Thus, the power transfer system 413 may transfer the AC power surplus to a DC side of the AC-DC hybrid microgrid 400 for assisting with a DC power shortfall.

In some implementations, if excess power of a particular type is not present for satisfying a shortfall of the other power type, the processing and control unit 312 may enable one or more additional energy resource systems to satisfy the net DC load and/or the net AC load. Additionally, or alternatively, the processing and control unit 312 may import additional power from the electrical power distribution system 218 (e.g., an AC utility grid) to satisfy the net DC load and/or the net AC load. For example, the processing and control unit 312 may enable a switch 420 that connects the electrical power distribution system 218 to the AC bus in order to import AC power from the electrical power distribution system 218. If the imported AC power is needed on the DC side, the processing and control unit 312 may control the power transfer system 413 to convert the imported AC power into DC power. The processing and control unit 312 may disable the switch 420 to disconnect the electrical power distribution system 218 from the AC bus.

The processing and control unit 312 may dynamically balance the power supply from various energy resource systems based on real-time demand, constraints, and cost-effectiveness. The processing and control unit 312 may ensure that the AC-DC hybrid microgrid 400 operates efficiently, while maintaining stability and minimizing costs.

In some implementations, each local controller 406 may determine an available output power for a respective energy resource system based on one or more of the operational constraints, and transmit an indication of the available output power to the microgrid controller 110 (e.g., to the aggregator 310). Each local controller 406 may determine the available output power for the respective energy resource system based on optimizing a performance of the respective energy resource system based on the one or more operational constraints.

The aggregator 310 may identify, based on information received from the plurality of local controllers 406, which types of loads are connected to the AC-DC hybrid microgrid 400, including AC loads and/or DC loads. The aggregator 310 may determine, based on the available output power indicated by each local controller 406, a net available DC output power available from the DC energy resource systems 402 and a net available AC output power available from the AC energy resource systems 404. The aggregator 310 may determine the net DC load corresponding to the DC loads 408 connected to the AC-DC hybrid microgrid 400, and determine the net AC load corresponding to the AC loads 410 connected to the AC-DC hybrid microgrid 400.

The processing and control unit 312 may dispatch the power from the plurality of energy resource systems to the one or more loads, including prioritizing a dispatch of available DC power from the net available DC output power to the DC loads 408 for satisfying at least a portion of the net DC load, and prioritizing a dispatch of available AC power from the net available AC output power to the AC loads 410 for satisfying at least a portion of the net AC load. One or more DC power buses may be used to route dispatched DC power to the DC loads 408. One or more AC power buses may be used to route dispatched AC power to the AC loads 410.

Thus, the processing and control unit 312 may dispatch power to the one or more loads, including prioritizing an allocation of the net available DC output power to the DC loads 408 for satisfying at least a portion of the net DC load, and prioritizing an allocation of the net available AC output power to the AC loads 410 for satisfying at least a portion of the net AC load. After satisfying the net DC load with the net available DC output power, the processing and control unit 312 may dispatch a remaining DC portion of the net available DC output power to the AC loads 410 for satisfying the net AC load, or after satisfying the net AC load with the net available AC output power, the processing and control unit 312 may dispatch a remaining AC portion of the net available AC output power to the DC loads 408 for satisfying the net DC load. The processing and control unit 312 may control one or more converters 414 to convert the remaining DC portion into additional AC power for satisfying the net AC load, and/or to convert the remaining AC portion into additional DC power for satisfying the net DC load.

The aggregator 310 may calculate a DC difference between the net available DC output power and the net DC load to determine whether the DC difference indicates that the net available DC output is sufficient to satisfy the net DC load. The processing and control unit 312 may dispatch, based on the DC difference indicating that the net available DC output is sufficient to satisfy the net DC load, at least a portion of the net available DC output power to the DC loads 408 for satisfying the net DC load. The processing and control unit 312 may dispatch, based on the DC difference indicating that the net available DC output is insufficient to satisfy the net DC load, the net available DC output power to the DC loads 408 for partially satisfying the net DC load.

Additionally, the aggregator 310 may calculate an AC difference between the net available AC output power and the net AC load to determine whether the AC difference is an AC power surplus. The processing and control unit 312 may, based on the DC difference being insufficient to satisfy the net DC load and based on the AC difference being the AC power surplus, route at least a portion of the AC power surplus to a power converter to convert the portion of the AC power surplus into supplemental DC power, and dispatch the supplemental DC power for at least partially satisfying the net DC load.

Additionally, the processing and control unit 312 may determine whether the supplemental DC power, in combination with the net available DC output power, is insufficient to satisfy the net DC load. The processing and control unit 312 may enable, based on the supplemental DC power, in combination with the net available DC output power, being insufficient to satisfy the net DC load, one or more additional energy resource systems to satisfy the net DC load. In other words, if a sum of the supplemental DC power (e.g., converted from the AC DERs) and the net available DC output power (e.g., provided by the DC DERs) is insufficient to satisfy the net DC load, the processing and control unit 312 may add, enable, or bring online one or more additional energy resource systems to satisfy the net DC load. The sum of the supplemental DC power and the net available DC output power may be considered as an updated net available DC output power, derived from DC power and AC-to-DC converted power.

Additionally, or alternatively, the processing and control unit 312 may determine whether the supplemental DC power, in combination with the net available DC output power, is insufficient to satisfy the net DC load. The processing and control unit 312 may import, based on the supplemental DC power, in combination with the net available DC output power, being insufficient to satisfy the net DC load, additional power from the electrical power distribution system 218 to satisfy the net DC load. In other words, if a sum of the supplemental DC power (e.g., converted from the AC DERs) and the net available DC output power (e.g., provided by the DC DERs) is insufficient to satisfy the net DC load, the processing and control unit 312 may import power from the electrical power distribution system 218 to satisfy the net DC load.

Additionally, or alternatively, the processing and control unit 312 may calculate an AC difference between the net available AC output power and the net AC load to determine whether the AC difference is an AC power shortfall. The processing and control unit 312 may, based on the DC difference being insufficient to satisfy the net DC load and based on the AC difference being the AC power shortfall, enable one or more additional energy resource systems to satisfy the net DC load, or import additional power from the electrical power distribution system 218 to satisfy the net DC load.

In some implementations, the aggregator 310 may calculate an AC difference between the net available AC output power and the net AC load to determine whether the AC difference indicates that the net available AC output is sufficient to satisfy the net AC load. The processing and control unit 312 may dispatch, based on the AC difference indicating that the net available AC output is sufficient to satisfy the net AC load, at least a portion of the net available AC output power to the AC loads 410 for satisfying the net AC load. The processing and control unit 312 may dispatch, based on the AC difference indicating that the net available AC output is insufficient to satisfy the net AC load, the net available AC output power to the AC loads 410 for partially satisfying the net AC load.

Additionally, the aggregator 310 may calculate a DC difference between the net available DC output power and the net DC load to determine whether the DC difference is a DC power surplus. The processing and control unit 312 may, based on the AC difference being insufficient to satisfy the net AC load and based on the DC difference being the DC power surplus, route at least a portion of the DC power surplus to a power converter to convert the portion of the DC power surplus into supplemental AC power, and dispatch the supplemental AC power for at least partially satisfying the net AC load.

Additionally, the processing and control unit 312 may determine whether the supplemental AC power, in combination with the net available AC output power, is insufficient to satisfy the net AC load. The processing and control unit 312 may enable, based on the supplemental AC power, in combination with the net available AC output power, being insufficient to satisfy the net AC load, one or more additional energy resource systems to satisfy the net AC load. In other words, if a sum of the supplemental AC power (e.g., converted from the DC DERs) and the net available AC output power (e.g., provided by the AC DERs) is insufficient to satisfy the net AC load, the processing and control unit 312 may add, enable, or bring online one or more additional energy resource systems to satisfy the net AC load. The sum of the supplemental AC power and the net available AC output power may be considered as an updated net available AC output power, derived from AC power and DC-to-AC converted power.

Additionally, or alternatively, the processing and control unit 312 may determine whether the supplemental AC power, in combination with the net available AC output power, is insufficient to satisfy the net AC load. The processing and control unit 312 may import, based on the supplemental AC power, in combination with the net available AC output power, being insufficient to satisfy the net AC load, additional power from the electrical power distribution system 218 to satisfy the net AC load. In other words, if a sum of the supplemental AC power (e.g., converted from the DC DERs) and the net available AC output power (e.g., provided by the AC DERs) is insufficient to satisfy the net AC load, the processing and control unit 312 may import power from the electrical power distribution system 218 to satisfy the net AC load.

Additionally, or alternatively, the aggregator 310 may calculate a DC difference between the net available DC output power and the net DC load to determine whether the DC difference is a DC power shortfall. The processing and control unit 312 may, based on the AC difference being insufficient to satisfy the net AC load and based on the DC difference being the DC power shortfall, enable one or more additional energy resource systems to satisfy the net AC load, or import additional power from the electrical power distribution system 218 to satisfy the net AC load.

Since each energy resource system's local controller 406 will perform optimization and coordinate with the aggregator 310 or central controller, this will reduce a computational load on the central controller (e.g., the microgrid controller 110). This will make the microgrid control system scalable.

FIG. 5 is a flowchart of an example process 500 associated with distributed optimization for a hybrid AC-DC microgrid. One or more process blocks of FIG. 5 may be performed by a microgrid controller (e.g., microgrid controller 110). Additionally, or alternatively, one or more process blocks of FIG. 5 may be performed by another device or a group of devices separate from or including the microgrid controller, such as another device or component that is internal or external to the hybrid AC-DC microgrid.

As shown in FIG. 5, process 500 may include receiving energy resource information from each energy resource system of a plurality of energy resource systems, the energy resource information including an available output power (block 510). For example, the microgrid controller 110 may receive the energy resource information from each energy resource system of the plurality of energy resource systems, as described above. The plurality of energy resource systems may include DC energy resource systems configured to supply DC power, and AC energy resource systems configured to supply AC power.

As further shown in FIG. 5, process 500 may include determining, based on the available output power indicated by each energy resource system, a net available DC output power available from the DC energy resource systems and a net available AC output power available from the AC energy resource systems (block 520). For example, the microgrid controller 110 may determine, based on the available output power indicated by each energy resource system, the net available DC output power available from the DC energy resource systems and the net available AC output power available from the AC energy resource systems, as described above.

As further shown in FIG. 5, process 500 may include determining a net DC load corresponding to the DC loads (block 530). For example, the microgrid controller 110 may determine the net DC load corresponding to the DC loads, as described above.

As further shown in FIG. 5, process 500 may include determining a net AC load corresponding to the AC loads (block 540). For example, the microgrid controller 110 may determine the net AC load corresponding to the AC loads, as described above.

As further shown in FIG. 5, process 500 may include dispatching power from the plurality of energy resource systems to the DC loads and the AC loads (block 550). For example, the microgrid controller 110 may dispatch power from the plurality of energy resource systems to the DC loads and the AC loads, as described above. Dispatching the power from the plurality of energy resource systems to the DC loads and the AC loads may include prioritizing the net available DC output power to the DC loads for satisfying at least a portion of the net DC load, and prioritizing the net available AC output power to the AC loads for satisfying at least a portion of the net AC load; and, after satisfying the net DC load, dispatching a remaining DC portion of the net available DC output power to the AC loads for satisfying at least an additional portion of the net AC load, or, after satisfying the net AC load, dispatching a remaining AC portion of the net available AC output power to the DC loads for satisfying at least an additional portion of the net DC load.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
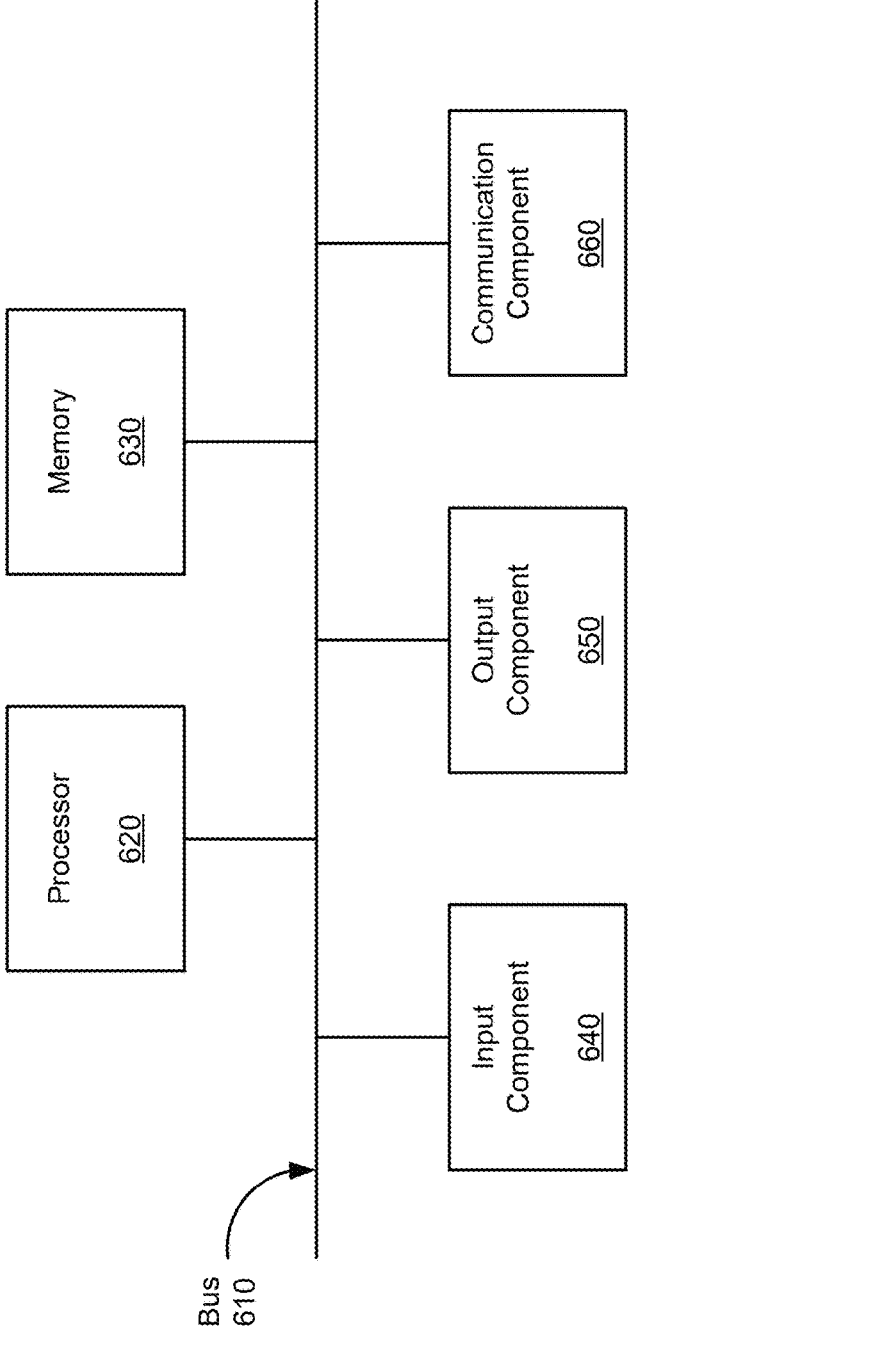
FIG. 6 is a diagram of example components of the microgrid controller associated with distributed optimization for a hybrid AC-DC microgrid.

FIG. 6 is a diagram of example components of the microgrid controller 110 associated with distributed optimization for a hybrid AC-DC microgrid. The microgrid controller 110 may include a bus 610, a processor 620, a memory 630, an input component 640, an output component 650, and/or a communication component 660.

The bus 610 may include one or more components that enable wired and/or wireless communication among the components of the microgrid controller 110. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus.

The processor 620 may include a central processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. The processor 620 may include one or more processors capable of being programmed to perform one or more operations or processes described elsewhere herein. For example, the processor 620 may include the aggregator 310 and/or the processing and control unit 312. The processor 620 may generate control signals controlling components of the hybrid AC-DC microgrid and for dispatching power within the hybrid AC-DC microgrid, as described above.

The memory 630 may store information, one or more instructions and/or software (e.g., one or more software applications) related to the operation of the microgrid controller 110. The memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the microgrid controller 110 to receive input, load information, generator data, energy storage data, status information, scheduling information, and/or control signals (e.g., control signals from a macrogrid controller). The output component 650 may enable the microgrid controller 110 to provide output, such as one or more control signals for controlling loads, energy storage systems, breakers, switches, and other components associated with the microgrid described herein. The communication component 660 may enable the microgrid controller 110 to communicate with other devices, such as local controllers, switches, converters, and utility grids, via a wired connection and/or a wireless connection. For example, the communication component 660 may include a receiver, a transmitter, and/or a transceiver.

The microgrid controller 110 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. Execution of the set of instructions, by one or more processors 620, may cause the one or more processors 620 and/or the microgrid controller 110 to perform one or more operations or processes described herein. Hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

INDUSTRIAL APPLICABILITY

A microgrid system described herein may include a microgrid controller configured as a central computing resource, distributed local controllers configured as distributed computing resources, and an aggregator, that operate in combination to optimize a performance in hybrid AC-DC microgrid. The distributed local controllers may be configured to perform parallel computing to process data to solve respective optimization problems. For example, each local controller may process data and solve respective optimization problems associated with a respective DER. Thus, the distributed local controllers may perform processing and optimization sub-tasks (e.g., local-level processing tasks) that may be typically handled by a centralized controller, such as the microgrid controller.

By handling the processing and optimization sub-tasks, the distributed local controllers may reduce a processing demand on the microgrid controller that would typically be used for performing the processing and optimization sub-tasks. As a result, the microgrid controller may dedicate its own processing resources to performing system-level processing tasks and system-level monitoring and control, as opposed to local-level processing tasks, monitoring, and control. The distributed local controllers may enable more efficient handling of local-level tasks at the distributed local controllers and system-level tasks at the microgrid controller. For example, the distributed local controllers may enable the microgrid system to handle processing tasks in a more efficient manner, by overcoming the processing constraints of a centralized controller.

The aggregator may enable iterative coordination between the distributed local controllers and the microgrid controller to facilitate an information exchange between the distributed local controllers and a main processor of the microgrid controller.

Accordingly, the microgrid system may address problems that exist in microgrids that have DC-coupled DERs connected to an AC grid. For example, when a power flow is optimized using AC grid constraints only, DC branch flow limits, DC side losses, and other DC parameters are ignored, leading to sub-optimal power flow and reduced energy efficiency. The microgrid system disclosed herein may use parallel computing, by way of the distributed local controllers, to efficiently process local-level information to optimize one or more parameters and send optimized parameters and/or system-level information to the aggregator. In addition, the aggregator may provide iterative coordination by establishing information exchange between the distributed local controllers and the microgrid controller. The iterative coordination may enable both AC constraints and DC constraints to be considered for optimizing operations of DC-coupled DERs, AC-coupled DERs, DC loads, and AC loads provided in the hybrid AC-DC microgrid to utilize DC power and AC power efficiently. By deploying a hybrid AC-DC distributed optimization scheme, power flow can be optimized, in consideration with both AC and DC constraints, leading to improved energy efficiency and effective scheduling of DC-coupled and AC-coupled DERs in various operating modes, including grid-connected mode and stand-alone mode.

What is claimed is:

1. A microgrid system, comprising:
a plurality of energy resource systems configured to supply power to a microgrid, wherein the plurality of energy resource systems includes direct current (DC) energy resource systems configured to supply DC power, and alternating current (AC) energy resource systems configured to supply AC power;
a plurality of local controllers, wherein each local controller of the plurality of local controllers is associated with a respective energy resource system of the plurality of energy resource systems, for controlling the respective energy resource system;
a plurality of power buses configured to deliver power from the plurality of energy resource systems to one or more loads; and
a microgrid controller,
wherein each local controller is configured to determine an available output power for a respective energy resource system based on one or more operational constraints, and transmit an indication of the available output power to the microgrid controller, and
wherein the microgrid controller is configured to determine, based on the available output power indicated by each local controller, a net available DC output power available from the DC energy resource systems and a net available AC output power available from the AC energy resource systems.

2. The microgrid system of claim 1, wherein the microgrid controller is configured to determine a net DC load corresponding to DC loads connected to the microgrid,
wherein the microgrid controller is configured to determine a net AC load corresponding to AC loads connected to the microgrid, and
wherein the microgrid controller is configured to dispatch the power from the plurality of energy resource systems to the one or more loads, including prioritizing a dispatch of available DC power from the net available DC output power to the DC loads for satisfying at least a portion of the net DC load, and prioritizing a dispatch of available AC power from the net available AC output power to the AC loads for satisfying at least a portion of the net AC load.

3. The microgrid system of claim 2, wherein the microgrid controller is configured to calculate a DC difference between the net available DC output power and the net DC load to determine whether the DC difference indicates that the net available DC output is sufficient to satisfy the net DC load,
wherein the microgrid controller is configured to dispatch, based on the DC difference indicating that the net available DC output is sufficient to satisfy the net DC load, at least a portion of the net available DC output power to the DC loads for satisfying the net DC load, and
wherein the microgrid controller is configured to dispatch, based on the DC difference indicating that the net available DC output is insufficient to satisfy the net DC load, the net available DC output power to the DC loads for partially satisfying the net DC load.

4. The microgrid system of claim 3, wherein the microgrid controller is configured to calculate an AC difference between the net available AC output power and the net AC load to determine whether the AC difference is an AC power surplus, and wherein the microgrid controller is configured to, based on the DC difference being insufficient to satisfy the net DC load and based on the AC difference being the AC power surplus:
route at least a portion of the AC power surplus to a power converter to convert the portion of the AC power surplus into supplemental DC power, and
dispatch the supplemental DC power for at least partially satisfying the net DC load.

5. The microgrid system of claim 4, wherein the microgrid controller is configured to determine whether the supplemental DC power, in combination with the net available DC output power, is insufficient to satisfy the net DC load, and
wherein the microgrid controller is configured to enable, based on the supplemental DC power, in combination with the net available DC output power, being insufficient to satisfy the net DC load, one or more additional energy resource systems to satisfy the net DC load.

6. The microgrid system of claim 4, wherein the microgrid controller is configured to determine whether the supplemental DC power, in combination with the net available DC output power, is insufficient to satisfy the net DC load, and
wherein the microgrid controller is configured to import, based on the supplemental DC power, in combination with the net available DC output power, being insufficient to satisfy the net DC load, additional power from a utility grid to satisfy the net DC load.

7. The microgrid system of claim 3, wherein the microgrid controller is configured to calculate an AC difference between the net available AC output power and the net AC load to determine whether the AC difference is an AC power shortfall, and
wherein the microgrid controller is configured to, based on the DC difference being insufficient to satisfy the net DC load and based on the AC difference being the AC power shortfall:
enable one or more additional energy resource systems to satisfy the net DC load, or
import additional power from a utility grid to satisfy the net DC load.

8. The microgrid system of claim 2, wherein the microgrid controller is configured to calculate an AC difference between the net available AC output power and the net AC load to determine whether the AC difference indicates that the net available AC output is sufficient to satisfy the net AC load,
wherein the microgrid controller is configured to dispatch, based on the AC difference indicating that the net available AC output is sufficient to satisfy the net AC load, at least a portion of the net available AC output power to the AC loads for satisfying the net AC load, and
wherein the microgrid controller is configured to dispatch, based on the AC difference indicating that the net available AC output is insufficient to satisfy the net AC load, the net available AC output power to the AC loads for partially satisfying the net AC load.

9. The microgrid system of claim 8, wherein the microgrid controller is configured to calculate a DC difference between the net available DC output power and the net DC load to determine whether the DC difference is a DC power surplus, and
wherein the microgrid controller is configured to, based on the AC difference being insufficient to satisfy the net AC load and based on the DC difference being the DC power surplus:

route at least a portion of the DC power surplus to a power converter to convert the portion of the DC power surplus into supplemental AC power, and dispatch the supplemental AC power for at least partially satisfying the net AC load.

10. The microgrid system of claim 9, wherein the microgrid controller is configured to determine whether the supplemental AC power, in combination with the net available AC output power, is insufficient to satisfy the net AC load, and wherein the microgrid controller is configured to enable, based on the supplemental AC power, in combination with the net available AC output power, being insufficient to satisfy the net AC load, one or more additional energy resource systems to satisfy the net AC load.

11. The microgrid system of claim 9, wherein the microgrid controller is configured to determine whether the supplemental AC power, in combination with the net available AC output power, is insufficient to satisfy the net AC load, and wherein the microgrid controller is configured to import, based on the supplemental AC power, in combination with the net available AC output power, being insufficient to satisfy the net AC load, additional power from a utility grid to satisfy the net AC load.

12. The microgrid system of claim 8, wherein the microgrid controller is configured to calculate a DC difference between the net available DC output power and the net DC load to determine whether the DC difference is a DC power shortfall, and wherein the microgrid controller is configured to, based on the AC difference being insufficient to satisfy the net AC load and based on the DC difference being the DC power shortfall:

enable one or more additional energy resource systems to satisfy the net AC load, or import additional power from a utility grid to satisfy the net AC load.

13. The microgrid system of claim 1, wherein the microgrid controller is configured to determine a net DC load corresponding to DC loads connected to the microgrid, wherein the microgrid controller is configured to determine a net AC load corresponding to AC loads connected to the microgrid, and wherein the microgrid controller is configured to dispatch power to the one or more loads, including prioritizing an allocation of the net available DC output power to the DC loads for satisfying at least a portion of the net DC load, and prioritizing an allocation of the net available AC output power to the AC loads for satisfying at least a portion of the net AC load.

14. The microgrid system of claim 13, wherein the microgrid controller is configured to:

after satisfying the net DC load with the net available DC output power, dispatch a remaining DC portion of the net available DC output power to the AC loads for satisfying the net AC load, or after satisfying the net AC load with the net available AC output power, dispatch a remaining AC portion of the net available AC output power to the DC loads for satisfying the net DC load.

15. The microgrid system of claim 14, further comprising: one or more DC-to-AC converters configured to convert the remaining DC portion into additional AC power for satisfying the net AC load; and one or more AC-to-DC converters configured to convert the remaining AC portion into additional DC power for satisfying the net DC load.

16. The microgrid system of claim 1, wherein the plurality of power buses includes:

one or more DC power buses configured to route dispatched DC power to DC loads; and one or more AC power buses configured to route dispatched AC power to AC loads.

17. The microgrid system of claim 1, wherein the microgrid controller is configured to identify, based on information received from the plurality of local controllers, which types of loads are connected to the microgrid, including AC loads, DC loads, or AC loads and DC loads.

18. The microgrid system of claim 1, wherein each local controller is configured to determine the available output power for the respective energy resource system based on optimizing a performance of the respective energy resource system based on the one or more operational constraints.

19. The microgrid system of claim 1, wherein the microgrid controller includes an aggregator configured to aggregate information received from the plurality of local controllers.

20. A method for optimizing a hybrid microgrid including direct current (DC) loads and alternating current (AC) loads, the method comprising:

receiving, by a microgrid controller, energy resource information from each energy resource system of a plurality of energy resource systems, wherein the plurality of energy resource systems includes DC energy resource systems configured to supply DC power, and AC energy resource systems configured to supply AC power, and wherein the energy resource information includes an available output power;

determining, by the microgrid controller, based on the available output power indicated by each energy resource system, a net available DC output power available from the DC energy resource systems and a net available AC output power available from the AC energy resource systems;

determining, by the microgrid controller, a net DC load corresponding to the DC loads;

determining, by the microgrid controller, a net AC load corresponding to the AC loads;

dispatching, by the microgrid controller, power from the plurality of energy resource systems to the DC loads and the AC loads, including prioritizing the net available DC output power to the DC loads for satisfying at least a portion of the net DC load, and prioritizing the net available AC output power to the AC loads for satisfying at least a portion of the net AC load; and after satisfying the net DC load, dispatching, by the microgrid controller, a remaining DC portion of the net available DC output power to the AC loads for satisfying at least an additional portion of the net AC load, or after satisfying the net AC load, dispatching, by the microgrid controller, a remaining AC portion of the net available AC output power to the DC loads for satisfying at least an additional portion of the net DC load.

* * * * *